(12) United States Patent
Ohtsuka et al.

(10) Patent No.: US 7,927,025 B2
(45) Date of Patent: Apr. 19, 2011

(54) OPTICAL FIBER BRANCH CABLE, METHOD OF WIRING THE SAME, AND METHOD OF PROVIDING THE SAME

(75) Inventors: Kenichiro Ohtsuka, Kanagawa (JP); Katsuyuki Aihara, Kanagawa (JP); Keisuke Okada, Kanagawa (JP); Masaji Yahagi, Kanagawa (JP); Hiroshi Nagai, Tokyo (JP); Hideaki Tajima, Saitama (JP); Kimio Ito, Saitama (JP); Toshiyuki Igarashi, Saitama (JP)

(73) Assignees: Sumitomo Electric Industries, Ltd., Osaka (JP); Toyokuni Electric Cable Co., Ltd., Tokyo (JP)

( * ) Notice: Subject to any disclaimer, the term of this patent is extended or adjusted under 35 U.S.C. 154(b) by 351 days.

(21) Appl. No.: 12/085,528

(22) PCT Filed: Feb. 15, 2007

(86) PCT No.: PCT/JP2007/052767
§ 371 (c)(1),
(2), (4) Date: May 27, 2008

(87) PCT Pub. No.: WO2007/094428
PCT Pub. Date: Aug. 23, 2007

(65) Prior Publication Data
US 2009/0304339 A1    Dec. 10, 2009

(30) Foreign Application Priority Data

Feb. 16, 2006   (JP) ............................... P.2006-039769

(51) Int. Cl.
*G02B 6/38* (2006.01)
*G02B 6/44* (2006.01)

(52) U.S. Cl. ............................ 385/71; 385/106; 385/114
(58) Field of Classification Search .......... 385/100–114, 385/53
See application file for complete search history.

(56) References Cited

U.S. PATENT DOCUMENTS 6,259,843 B1 *  7/2001  Kondo ........................... 385/104
6,269,213 B1 *  7/2001  Ohta et al. ..................... 385/135

(Continued)

FOREIGN PATENT DOCUMENTS
JP            11-326718          11/1999

(Continued)

*Primary Examiner* — Ryan Lepisto
*Assistant Examiner* — Eric Wong
(74) *Attorney, Agent, or Firm* — McDermott Will & Emery LLP

(57) ABSTRACT

An optical fiber branch cable is provided that comprises a branch portion disposed stably with respect to a multi-core optical fiber cable of a trunk line from which branching is performed, that is excellent in handleability as a cable, and that exhibits high workability.

In the optical fiber branch cable of the invention, in a middle of a multi-core optical fiber cable 2 of a trunk line, a branch portion 11 is disposed. The branch portion 11 has: a base member 16 which is attached so as to cover a tensile-strength wire 9 in a portion where a cable jacket 10 of the multi-core optical fiber cable 2 is removed away; a multi-core optical connector 30 which is connected to the tip end of a tape unit 4 drawn out from the multi-core optical fiber cable 2; an extra-length housing portion 18 which houses an extra length of the tape unit 4 to which the multi-core optical connector 30 is connected; and a connector attaching portion 19 to which the multi-core optical connector 30 is attachable in a plural number.

13 Claims, 9 Drawing Sheets

U.S. PATENT DOCUMENTS

| | | |
|---|---|---|
| 7,127,143 B2 * | 10/2006 | Elkins et al. .............. 385/100 |
| 7,228,036 B2 * | 6/2007 | Elkins et al. .............. 385/100 |
| 7,680,388 B2 * | 3/2010 | Reagan et al. ............. 385/139 |
| 2005/0129375 A1 * | 6/2005 | Elkins et al. .............. 385/100 |

FOREIGN PATENT DOCUMENTS

| | | |
|---|---|---|
| JP | 2000-2811 | 1/2000 |
| JP | 2001-147269 | 5/2000 |
| JP | 2001-51131 | 2/2001 |
| JP | 2001-56424 | 2/2001 |
| JP | 2001-201641 | 7/2001 |
| JP | 2003-75695 | 3/2003 |
| JP | 2003-270489 | 9/2003 |
| JP | 2004-54148 | 2/2004 |
| JP | 2004-198573 | 7/2004 |
| JP | 2005-331692 | 12/2005 |

* cited by examiner

US 7,927,025 B2

OPTICAL FIBER BRANCH CABLE, METHOD OF WIRING THE SAME, AND METHOD OF PROVIDING THE SAME

RELATED APPLICATIONS

This application is the U.S. National Phase under 35 U.S.C. §371 of International Application No. PCT/JP2007/052767, filed on Feb. 15, 2007, which in turn claims the benefit of Japanese Application No. 2006-039769, filed on Feb. 16, 2006, the disclosures of which Applications are incorporated by reference herein.

TECHNICAL FIELD

The present invention relates to an optical fiber branch cable which is used for separating and wiring an arbitrary optical fiber from the middle of a multi-core optical fiber cable of a trunk line, a method of wiring it, and a method of providing it.

BACKGROUND ART

Conventionally, as an optical communication line which is used as a trunk line for wiring an optical fiber from an accommodation line station to a subscriber's building or the like, a multi-core optical fiber cable is laid in the outdoor such as the air or the underground, or in the indoor. According to the line design of an optical communication line, it is often performed to connect multi-core optical fiber cables together, or to conduct a connection while branching one multi-core optical fiber cable into plural optical fiber cables. In a connecting portion in an outdoor environment such as the air or the underground, particularly, a closure for protecting the connecting point in consideration of the waterproof property and the like, or performing an extra-length treatment on an optical fiber is disposed.

Recently, in accordance with further popularization of the Internet, a request for introducing an optical fiber into a general household is being increased, and optical fibers of a reduced number of cores or one or two cores are branched from a multi-core optical fiber cable of a trunk line.

In the case where an optical fiber cable is introduced and branched in a building or an apartment building, when, after the optical fiber cable is passed through a vertical pipe, a branching process is to be performed by breaking the cable jacket, a work in a narrow space is required, and hence wiring is difficult to be performed. Alternatively, a cable to which a branching process is previously applied in a factory may be wired on the site. In this case, however, the process and the design are cumbersome, and the production cost and the like are increased.

As disclosed in Patent Reference 1, therefore, a technique is proposed in which a structure of an optical cable branch portion is employed in a branch portion protector. The structure comprises: a connector fixing portion for fixing an optical connector which terminates the tip end of an optical fiber drawn out from an optical cable so that it can be connected to an optical fiber on the side of a branch optical cable; and an extra-length housing portion which houses an extra length of the optical fiber.

Patent Reference 1: JP-A-2000-2811

DISCLOSURE OF THE INVENTION

Problems that the Invention is to Solve

In the structure of an optical cable branch portion such as disclosed in Patent Reference 1, however, the structure for fixing the branch portion to a multi-core optical fiber cable of a trunk line exerts a very weak fixing force or has a cumbersome shape even though it exerts a strong fixing force. In the case where a branch portion case is attached to the periphery of a cable, for example, the fixing force is weak, and, in the case where the fixing force is to be enhanced, a cumbersome structure is formed in which a framework is disposed in the periphery of the branch portion of the cable and a resin is filled therein, thereby embedding and fixing the cable.

When the fixing force of the branch portion with respect to the cable is weak, it is difficult to perform wiring of the cable in a state where the branch portion is previously disposed on the cable, and this is not preferable in the viewpoint of the reliability maintenance. When the interior of the branch portion is buried by the resin, it is difficult to cope with, for example, a change of the branch destination after wiring.

Furthermore, a connector fixing portion to which an optical connector is to be fixed is disposed in the vicinity of the outer periphery of the branch portion, and the structure of the branch portion tends to be enlarged. Therefore, it is difficult to handle the branch portion integrally with a cable.

It is an object of the invention to provide an optical fiber branch cable that comprises a branch portion disposed stably with respect to a multi-core optical fiber cable of a trunk line from which branching is performed, that is excellent in handleability as a cable, and that exhibits high workability, a method of wiring it, and a method of providing it.

Means for Solving the Problems

The optical fiber branch cable of the invention which can solve the above-discussed problems is an optical fiber branch cable in which, in a middle of a multi-core optical fiber cable of a trunk line having plural optical fibers, a tensile-strength wire, and a cable jacket, one or more branch portions for the optical fibers are disposed, wherein the branch portion comprises: a base member which is attached so as to cover the tensile-strength wire in a portion where the cable jacket of the multi-core optical fiber cable is removed away; an optical connector which is connected to a tip end of the optical fiber drawn out from the multi-core optical fiber cable; an extra-length housing portion which houses an extra length of the optical fiber to which the optical connector is connected; and a connector attaching portion to which the optical connector is attachable in a plural number.

In the optical fiber branch cable of the invention, preferably, the multi-core optical fiber cable is a cable having a slotless structure in which the plural optical fibers are housed in a middle, and the tensile-strength wire is placed in the cable jacket formed in a periphery thereof.

In the optical fiber branch cable of the invention, preferably, the optical fibers drawn out from the multi-core optical fiber cable are in a form of an optical fiber ribbon, and the optical connector is a multi-core optical connector.

In this case, preferably, a notch which enables separation into the respective plural optical fibers is formed in a covering layer of the optical fiber ribbon.

In the optical fiber branch cable of the invention, preferably, the connector attaching portion is placed in a plural number in a circumferential direction of the base member.

In the optical fiber branch cable of the invention, preferably, the connector attaching portion is attachable to and detachable from the base member.

In the optical fiber branch cable of the invention, preferably, the connector attaching portion is movable with respect to the base member in a longitudinal direction of the multi-core optical fiber cable.

In the optical fiber branch cable of the invention, preferably, the branch portion comprises a cover which forms an outer shell thereof, and the cover is made of an elastic and antistatic material.

In the optical fiber branch cable of the invention, preferably, the branch portion comprises a branch line optical fiber cable fixing portion which fixes a branch line optical fiber cable that is a counter to be connected to the optical connector.

The method of wiring an optical fiber branch cable of the invention which can solve the above-discussed problems is characterized in that, after any one of optical fiber branch cables according to the invention and a branch line optical fiber cable which is a counter to be connected to the optical connector are wired, the branch line optical fiber cable is connected to the optical connector, and an extra length of the branch line optical fiber cable is housed in the branch portion.

The method of wiring an optical fiber branch cable of the invention which can solve the above-discussed problems is characterized in that, after any one of optical fiber branch cables according to the invention is wired and a branch line optical fiber cable is connected to the optical connector, the branch line optical fiber cable is wired.

The method of wiring an optical fiber branch cable of the invention which can solve the above-discussed problems is characterized in that, before any one of optical fiber branch cables according to the invention is wired, a branch line optical fiber cable is connected to the optical connector, and, while the optical fiber branch cable is wired, the branch line optical fiber cable is wired in a predetermined place.

The method of providing an optical fiber branch cable of the invention which can solve the above-discussed problems is characterized in that any one of optical fiber branch cables according to the invention is provided to a wiring place in a state where the optical fiber branch cable is wound around a drum.

The method of providing an optical fiber branch cable of the invention which can solve the above-discussed problems is characterized in that any one of optical fiber branch cables according to the invention and a branch line optical fiber cable are provided to a wiring place in a state where the branch line optical fiber cable is connected to the optical connector of the optical fiber branch cable, and the optical fiber branch cable and the branch line optical fiber cable are wound around a drum.

Effects of the Invention

According to the optical fiber branch cable of the invention, the base member is attached to the multi-core optical fiber cable of a trunk line so as to cover the tensile-strength wire in a portion where the cable jacket is removed away, and therefore the branch portion can be firmly fixed to the multi-core optical fiber cable without cutting the tensile-strength wire. Moreover, the tensile strength of the multi-core optical fiber cable is not lowered, and the handleability as a cable is excellent.

Since the base member has a shape covering the tensile-strength wire, moreover, it is placed in the vicinity of the center of the cable, and hence the extra-length housing portion and the connector attaching portion are easily placed in the vicinity thereof, whereby the structure of the branch portion can be miniaturized. Therefore, also a portion where the branch portion is disposed can be handled as a part of the cable in the same manner as a portion where only the multi-core optical fiber cable exists, and the wiring workability is excellent.

Since plural optical connectors can be attached to the connector attaching portion, furthermore, it is possible to flexibly cope with a change of the branch destination. Even when the branch portion is previously attached to the multi-core optical fiber cable, therefore, the wiring work can be satisfactorily performed on the site.

According to the above-described wiring method of the invention using such an optical fiber branch cable, even in the case where the optical fiber branch cable is vertically wired in a building or an apartment building and the branch line optical fiber cable is horizontally wired, the wiring work can be performed very easily and efficiently as compared with the conventional art.

According to the above-described method of providing an optical fiber branch cable of the invention, in the case where a multi-core optical fiber cable of a trunk line is to be carried in a wiring site, the cable can be carried and provided to the site while the cable is transported from the factory in the state of an optical fiber branch cable that already has a structure in which a branching wiring process can be easily performed. Therefore, the branching work in the site can be simplified.

DESCRIPTION OF REFERENCE NUMERALS AND SIGNS

1 . . . optical fiber branch cable, 2 . . . multi-core optical fiber cable, 3 . . . optical fiber, 4 . . . tape unit (optical fiber ribbon), 6 . . . notch, 7 . . . optical fiber ribbon, 9 . . . tensile-strength wire, 10 . . . cable jacket, 11 . . . branch portion, 12 . . . branch line optical fiber cable, 15 . . . cover, 16 . . . base member, 18 . . . extra-length housing portion, 19 . . . connector attaching portion, 20 . . . receptacle, 22 . . . cable gripping portion (branch line optical fiber cable fixing portion), 30 . . . multi-core optical connector.

BEST MODE FOR CARRYING OUT THE INVENTION

Hereinafter, an example of an embodiment of the optical fiber branch cable, the method of wiring it, and the method of providing it according to the invention will be described with reference to the drawings.

Figure 1:
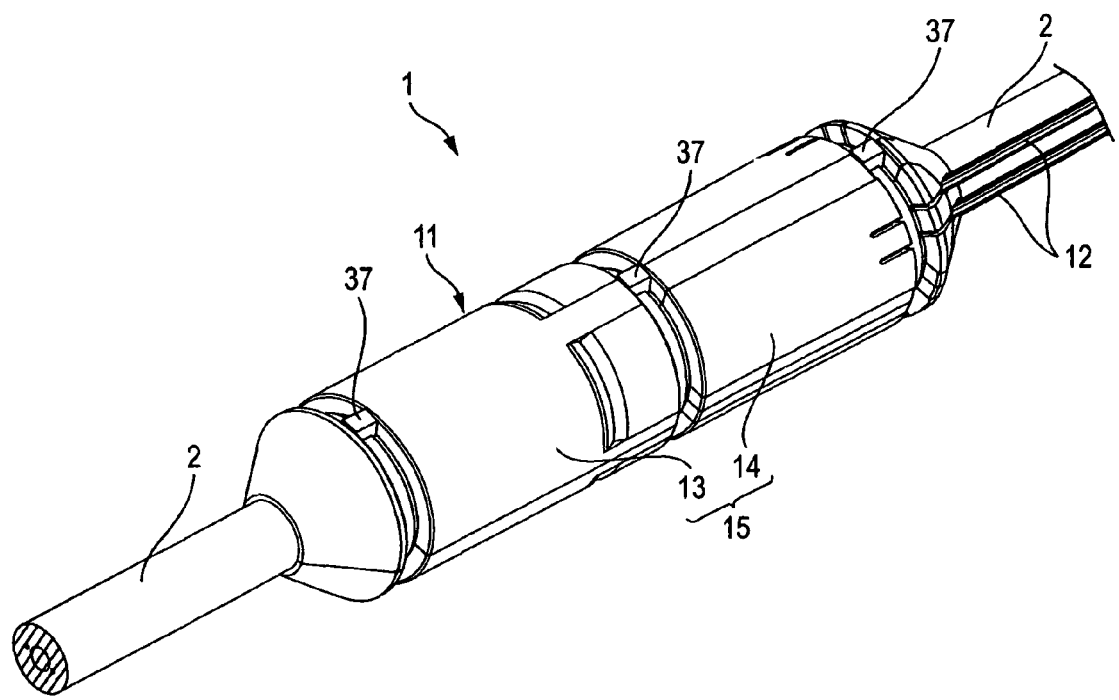
FIG. 1 is a perspective view showing the appearance of one embodiment of the optical fiber branch cable of the invention.
Figure 2:
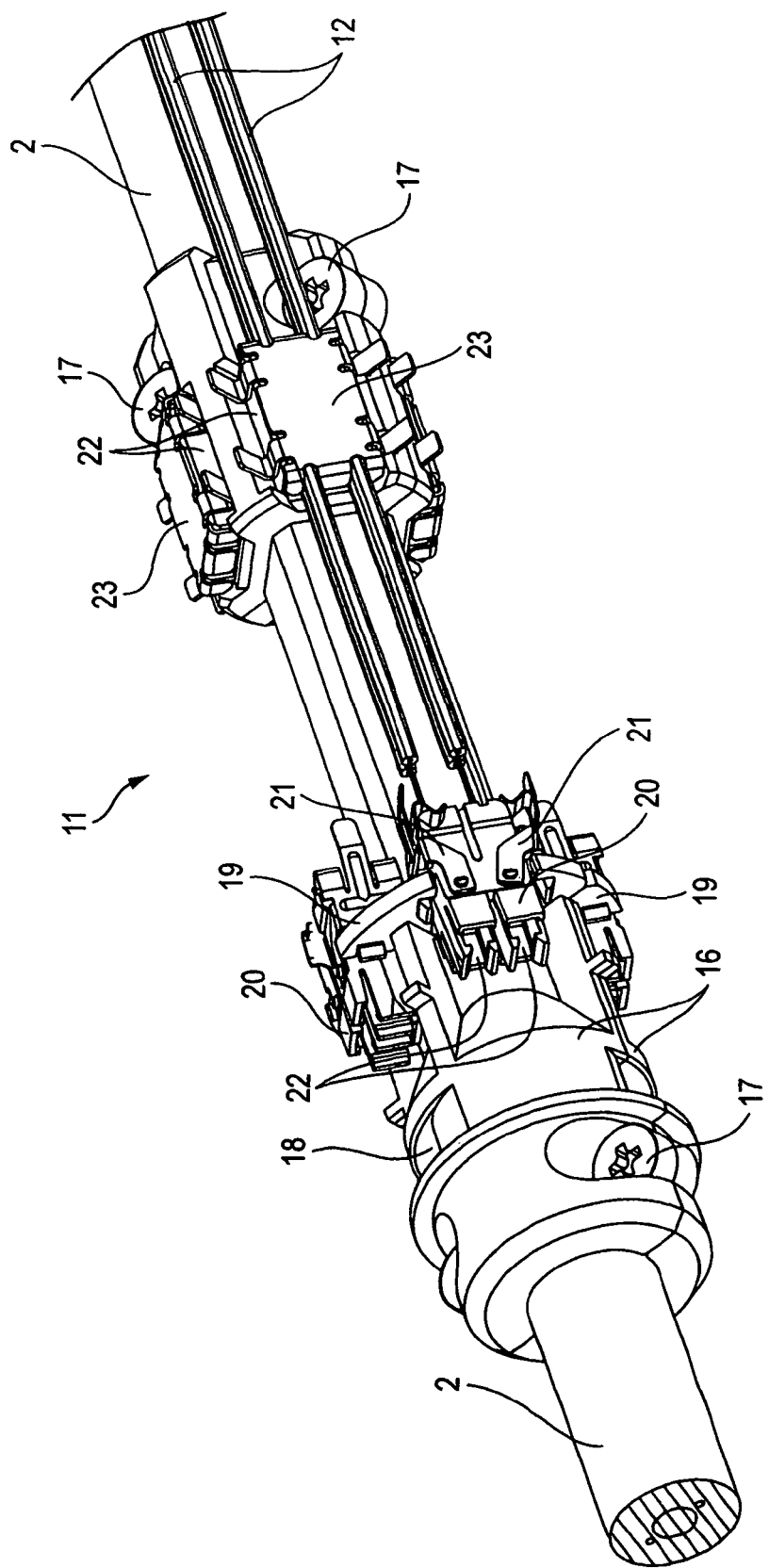
FIG. 2 is a perspective view showing the internal structure of a branch portion in the optical fiber branch cable of FIG. 1.
Figure 3:
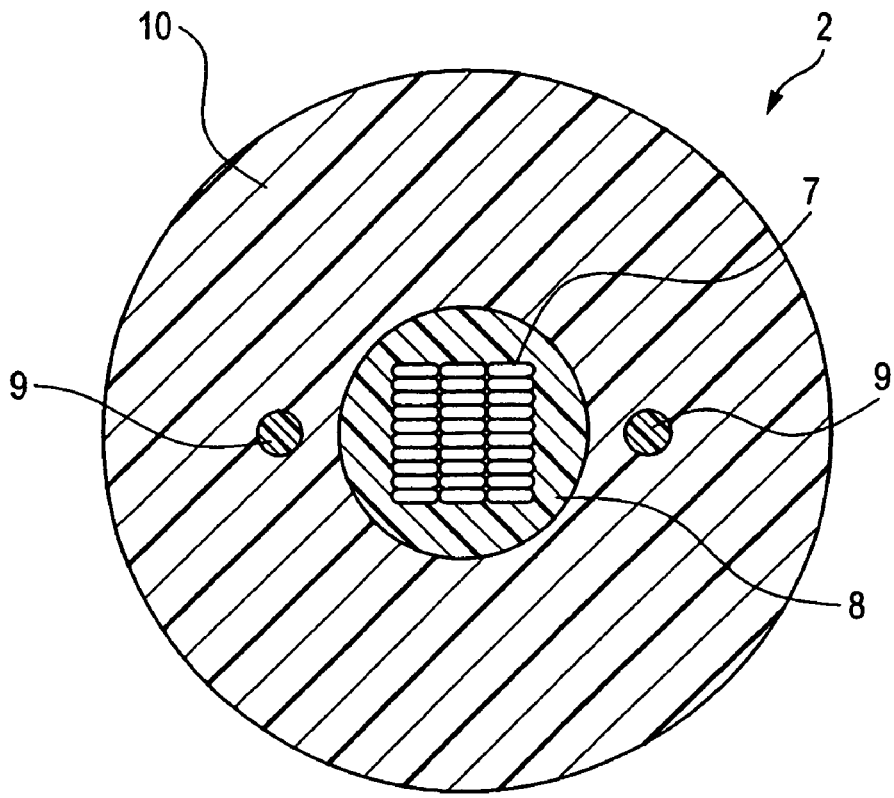
FIG. 3 is a section view of a multi-core optical fiber cable shown in FIGS. 1 and 2.
Figure 4:
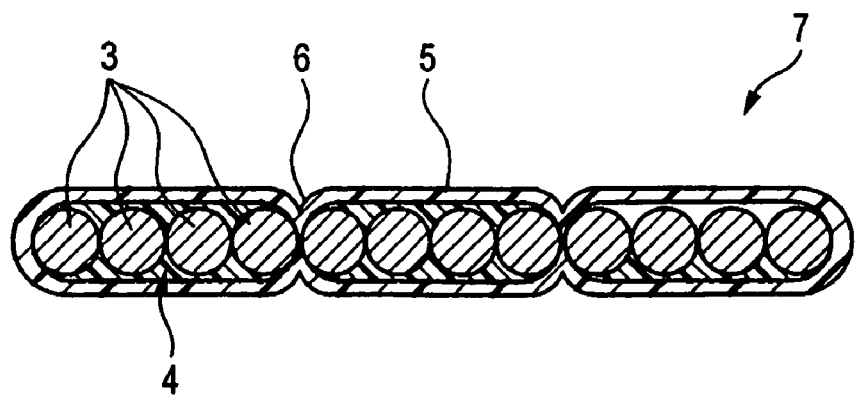
FIG. 4 is a section view of an optical fiber ribbon housed in the multi-core optical fiber cable shown in FIG. 3.
Figure 5:
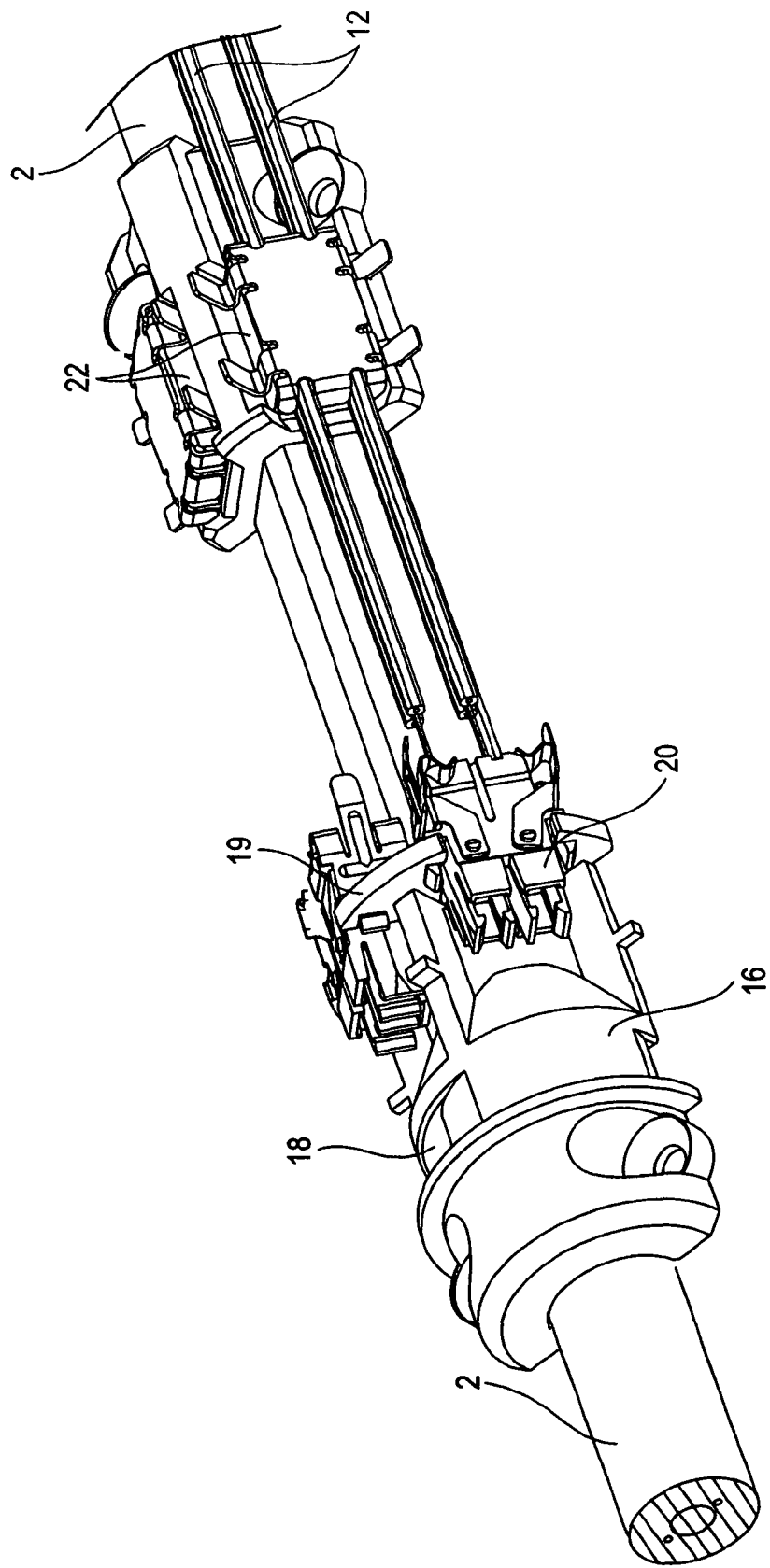
FIG. 5 is a perspective view showing a state where only a half portion of a base member shown in FIG. 2 is attached.
Figure 6:
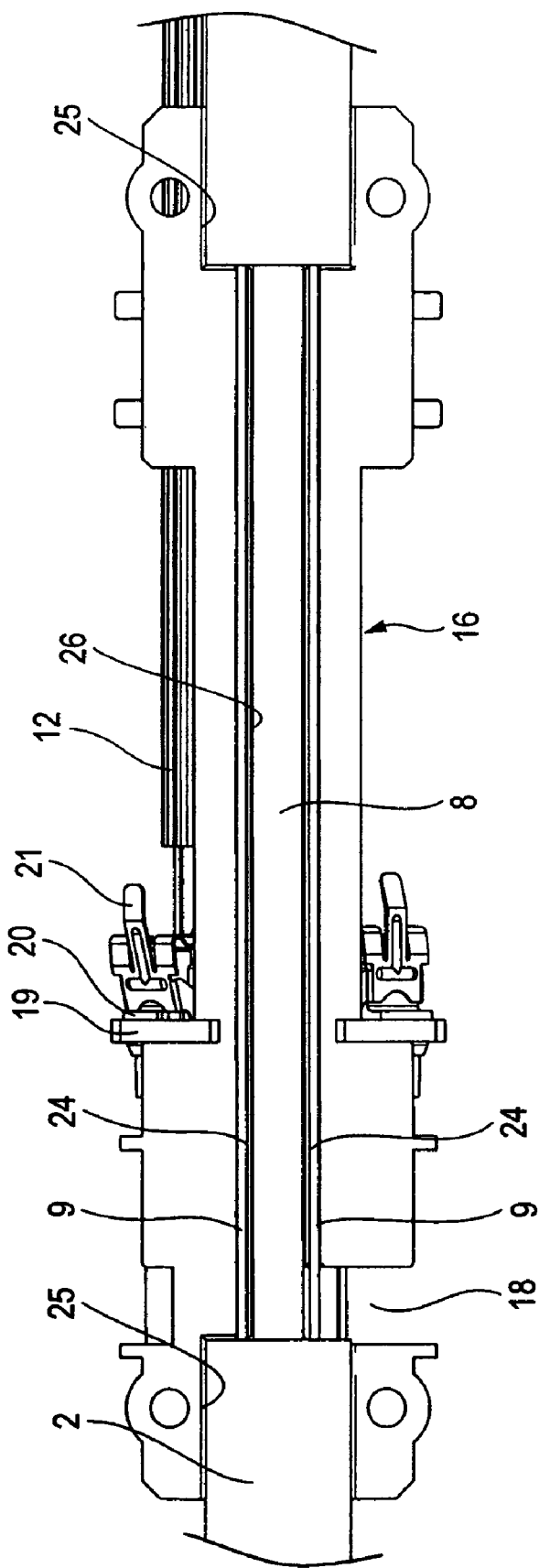
FIG. 6 is a plan view of FIG. 5 as seen from a lower side.
Figure 7:
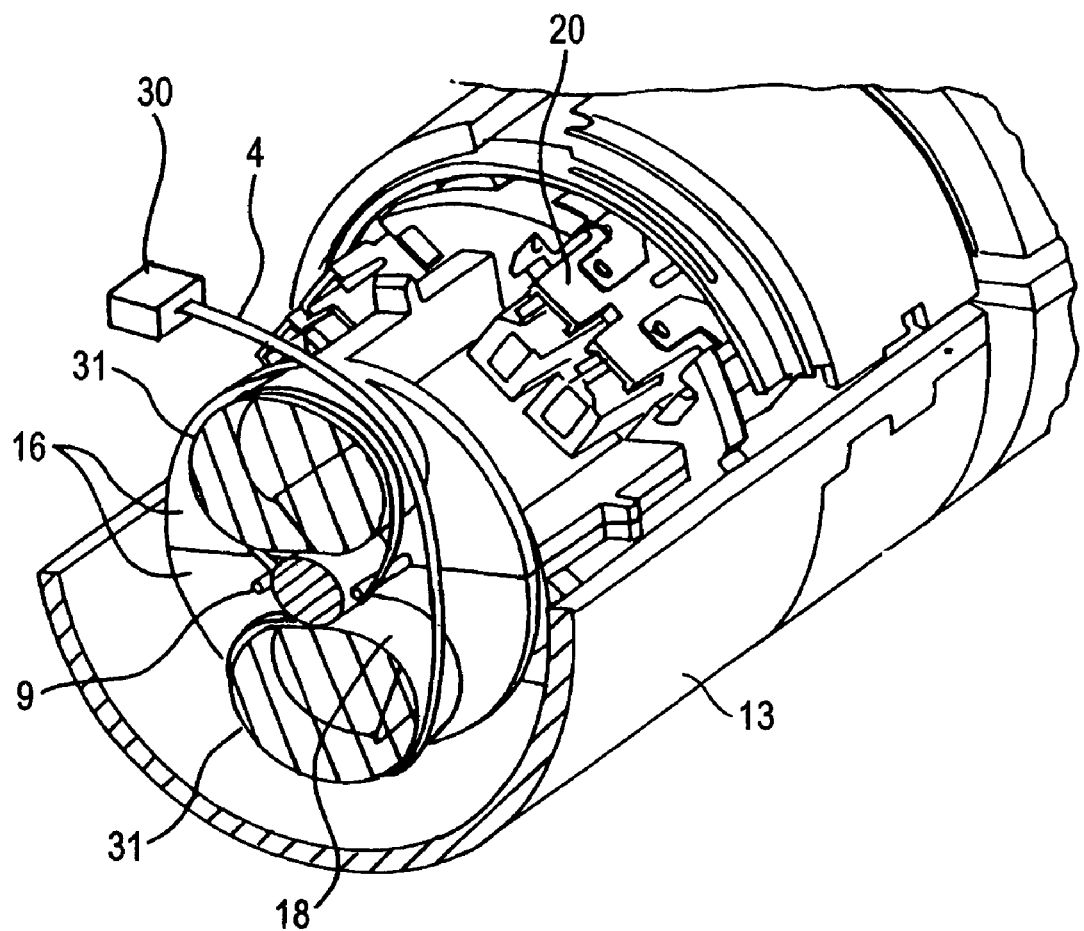
FIG. 7 is a sectional perspective view showing the vicinity of an extra-length housing portion.
Figure 8:
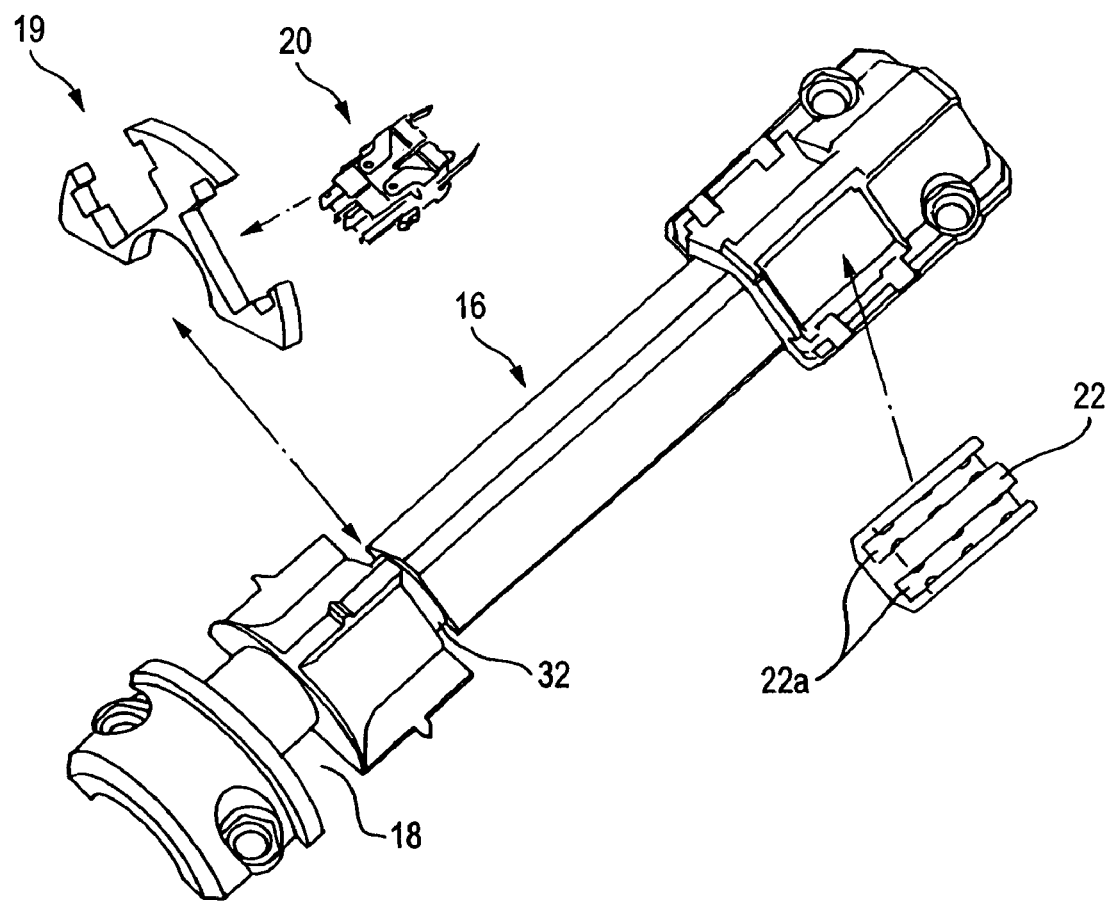
FIG. 8 is a perspective view showing attachments of members to the base member.
Figure 9:
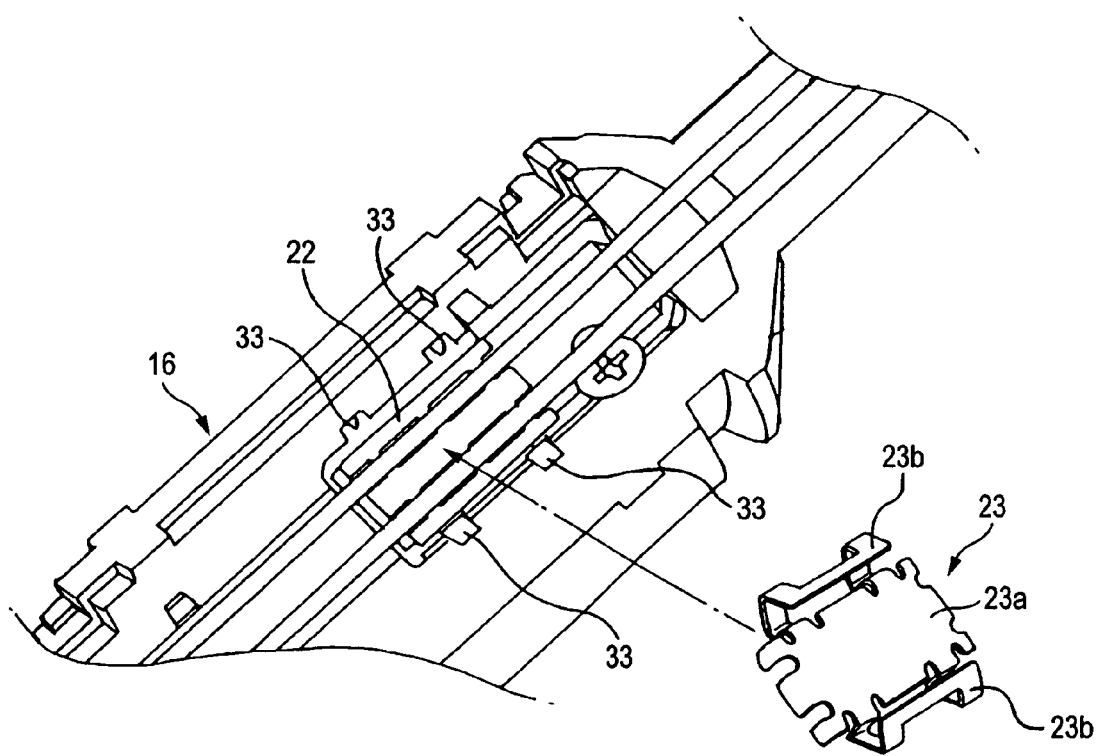
FIG. 9 is a perspective view showing the manner of fixing a branch line optical fiber cable.
Figure 10:
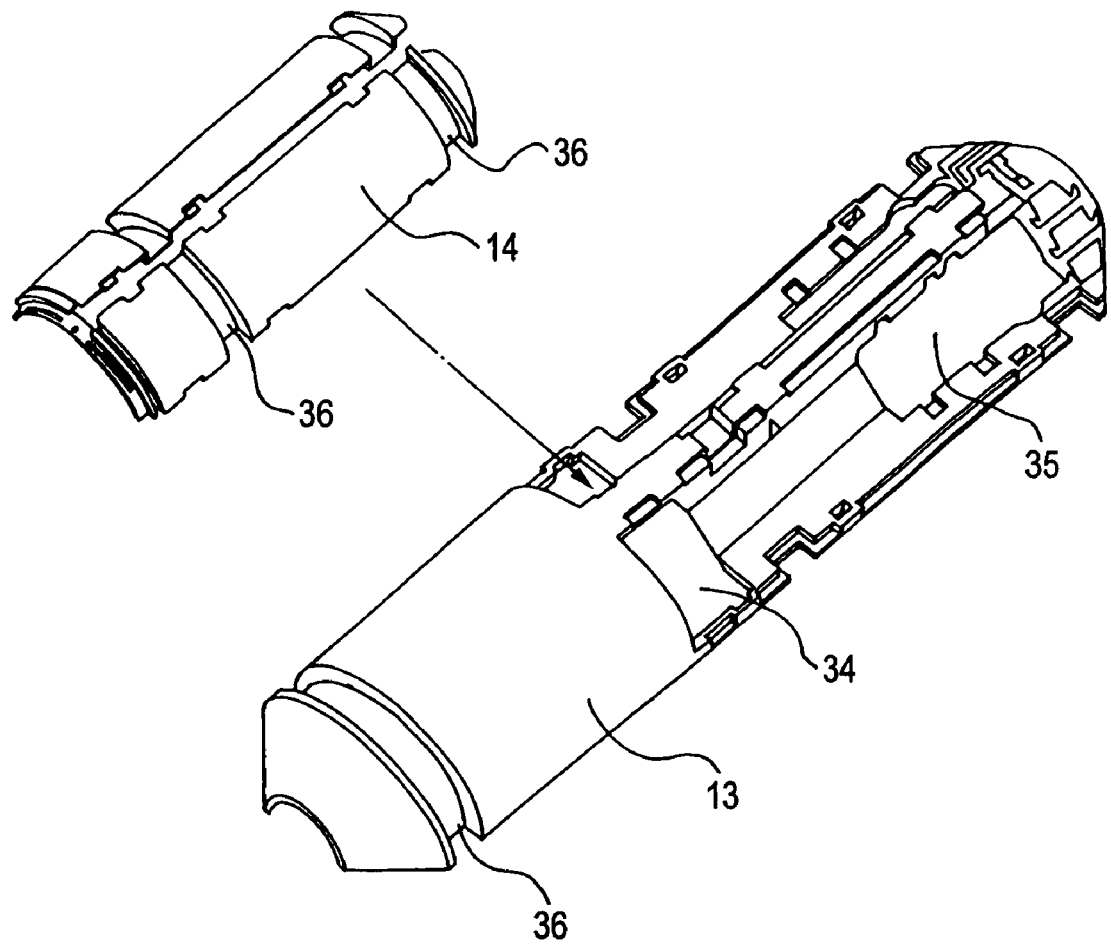
FIG. 10 is a perspective view showing a cover of the branch portion.

FIG. 1 is a perspective view showing the appearance of the optical fiber branch cable of the embodiment, FIG. 2 is a perspective view showing the internal structure of a branch portion in the optical fiber branch cable of FIG. 1, FIG. 3 is a section view of a multi-core optical fiber cable shown in FIGS. 1 and 2, FIG. 4 is a section view of an optical fiber ribbon housed in the multi-core optical fiber cable shown in FIG. 3, FIG. 5 is a perspective view showing a state where only a half portion of a base member shown in FIG. 2 is attached, FIG. 6 is a plan view of FIG. 5 as seen from a lower side, FIG. 7 is a sectional perspective view showing the vicinity of an extra-length housing portion, FIG. 8 is a perspective view showing attachments of members to the base member, FIG. 9 is a perspective view showing the manner of fixing a branch line optical fiber cable, and FIG. 10 is a perspective view showing a cover of the branch portion.

In the optical fiber branch cable 1, as shown in FIG. 1, the branch portion 11 is disposed in a middle of the multi-core optical fiber cable 2 of a trunk line, optical fibers of the multi-core optical fiber cable 2 are connected to branch line optical fiber cables 12 in the branch portion 11, and the periphery thereof is covered by the cover 15 configured by a main cover 13 which is an outer shell of the branch portion 11, and an opening and closing cover 14. The branch line optical fiber cables 12 which are connected in the branch portion 11 are drawn out to the outside from the branch portion 11 through the cover 15. In the optical fiber branch cable 1, one or more such branch portions 11 are disposed. Before wiring of the optical fiber branch cable 1, the connection of the branch line optical fiber cables 12 may be or may not be performed.

FIG. 2 shows the internal structure of the branch portion 11 from which the cover 15 is removed away. In the branch portion 11, a pair of base members 16 having a symmetric half-split shape are attached to the multi-core optical fiber cable 2, a portion of the multi-core optical fiber cable 2 from which the cable jacket is removed away is covered by the pair of base members 16 in a claming and butting manner, and the base members 16 are firmly fixed together by a screw 17. Preferably, the base members 16 are made of a light and highly rigid material such as aluminum.

In the vicinity of end portions in the longitudinal direction of the base members 16, the extra-length housing portion 18 having a space for housing an extra length of an optical fiber branched from the multi-core optical fiber cable 2 is formed. In a position close to the extra-length housing portion 18, a connector attaching portion 19 to which plural optical connectors can be attached is attached in a plural number (two in the embodiment) in the circumferential direction of the base members 16. Receptacles 20 to which two pairs of optical connectors can be connected in two directions are fitted and attached to the connector attaching portions 19.

To the receptacles 20, an optical connector 30 (see FIG. 7) which is connected to the tip end of an optical fiber branched from the multi-core optical fiber cable 2, and optical connectors (in FIG. 2, already attached into the receptacles 20) which are connected to the tip ends of the branch line optical fiber cables 12 can be attached. In the receptacles 20, connector pressing portions 21 which butt against the rear ends of the branch line optical fiber cables 12 to elastically urge the cables into the receptacles 20 are disposed, so that, even when a tension is applied to the branch line optical fiber cables 12, the connection state of the optical connectors inserted into the receptacles 20 can be maintained. When the optical connectors are to be inserted into or removed from the receptacles 20, the connector pressing portions 21 are opened or closed.

The branch line optical fiber cables 12 have a form of a drop cable having single or plural optical fibers. In FIG. 2, the optical connectors are connected to the tip ends of the optical fibers in the portions of the end portions of the branch line optical fiber cables 12 from which the cable jackets are removed away. Alternatively, optical connectors of the type in which the cable jackets of the branch line optical fiber cables 12 are not removed away and the cable jackets are directly gripped may be connected. In the alternative, it is not required to expose the optical fibers, and hence easy handling is attained, and it is not necessary to house and protect the optical fibers.

In positions separated from the extra-length housing portion 18 in the longitudinal direction of the base members 16, cable gripping portions 22 are attached as branch line optical fiber cable fixing portions for gripping and fixing the branch line optical fiber cables 12. Fixing covers 23 are attached to the cable gripping portions 22. The fixing covers 23 cover the cable gripping portions 22 which are in the state where they grip the branch line optical fiber cables 12, thereby preventing the branch line optical fiber cables 12 from being disengaged from the cable gripping portions 22. The fixation of the branch line optical fiber cables 12 to the cable gripping portions 22 enables that, even when a tensile force is applied from the external of the branch portion 11 to the branch line optical fiber cables 12, the force can be received by the cable gripping portions 22 and the base members 16, and hence it is possible to prevent the connection states of the receptacles 20 from being adversely affected.

In the multi-core optical fiber cable 2, as shown in FIG. 3, ten 12-core optical fiber ribbons 7 are stacked and placed in the middle. A buffer layer 8 made of aramid fibers or the like is disposed in the periphery of the ribbon, and the cable jacket 10 made of a thermoplastic resin is formed in the periphery of the layer. Two tensile-strength members 9 such as steel wires are embedded in the cable jacket 10. For example, the sizes of the portions are set as follows: the diameter of the buffer layer 8 is 5.5 mm; the outer diameters of the tensile-strength members 9 are 1.0 mm; the outer diameter of the cable jacket 10 is 16±0.8 mm; and the distance between the two tensile-strength members 9 is 8±0.6 mm.

In the optical fiber cable having such a slotless structure, when the cable jacket 10 is removed away, the optical fiber ribbons 7 which are internally housed can be easily taken out.

Alternatively, only one tensile-strength member 9 may be disposed in the multi-core optical fiber cable 2. In the case where only one tensile-strength member 9 is disposed, the flexibility of the multi-core optical fiber cable 2 is superior, and the wiring work is easily performed.

As shown in FIG. 4, the optical fiber ribbon 7 is formed by: flatly placing four optical fibers 3 each having a core and a cladding, in a parallel manner; collectively covering the four optical fibers to form a tape unit 4; flatly placing three tape units 4 in a parallel flat manner; and collectively covering the three tape units. The tape unit 4 has a form of a so-called 4-core optical fiber ribbon. In a covering layer 5 of the optical fiber ribbon 7, notches 6 are formed in boundary portions between the tape units 4, so that the ribbon is easily separated into the respective tape units 4 by breaking the covering layer 5 along the notches 6. The optical fibers housed in the multi-core optical fiber cable 2 may not have a form of an optical fiber ribbon. Alternatively, plural single-core optical fibers may be housed.

When the branch portion 11 is to be disposed in the multi-core optical fiber cable 2, first, a predetermined length (for example, 120 mm) of the cable jacket 10 of the multi-core optical fiber cable 2 is removed away, and one of the base members 16 is attached to the portion. FIGS. 5 and 6 show the state where the one base member 16 is attached. Preferably, the length by which the cable jacket 10 is removed away is set to be not less than 40 mm and not more than 150 mm. When the length by which the cable jacket 10 is removed away is less than 40 mm, the length by which the optical fibers are taken out is insufficient, and works of removing and cutting the cover of the optical fibers are difficult to do. When the length by which the cable jacket 10 is removed away is more than 150 mm, the branch portion 11 is correspondingly longer, and there is a possibility that the housing property of the branch portion 11 becomes problematic.

In the base member 16, a cable core housing groove 26 is formed in the inside of the middle, and the optical fiber ribbons 7 and the buffer layer 8 are housed in the cable core housing groove 26. Two tensile-strength member housing grooves 24 are formed in the vicinity of the outside of the cable core housing groove 26. The two tensile-strength members 9 are housed in the grooves, respectively. The base member 16 is fixed to the two tensile-strength members 9 which are placed in parallel to each other, and hence not axially rotated and twisted with respect to the multi-core optical fiber cable 2, so that stable positioning is attained with respect to a plane including the two tensile-strength members 9.

In the insides of the both ends in the longitudinal direction of the base member 16, outer-jacket housing portions 25 which house end portions of the cable jacket 10 of the multi-core optical fiber cable 2 to attain positioning in the longitudinal direction with respect to the multi-core optical fiber cable 2.

As shown in FIG. 6, one end in the longitudinal direction of the cable core housing groove 26 communicates with the extra-length housing portion 18, and, from the end, arbitrary one or plural of the optical fiber ribbons 7 or the tape units 4 are taken out. In the case where the optical fiber ribbon 7 is taken out, it may be separated into the tape units 4, or into single-core optical fibers 3.

After the one base member 16 is attached as shown in FIGS. 5 and 6, the other base member 16 butts thereagainst, and the base members 16 are fixed to each other by the screw 17.

As shown in FIG. 7, the multi-core optical connector 30 is collectively connected to the tip end of the tape unit 4 taken out from the extra-length housing portion 18, and the tape unit 4 is housed in the extra-length housing portion 18 while being wound around two barrel portions 31 disposed in the extra-length housing portion 18, so as not be bent at a diameter which is smaller than a predetermined bending diameter. The multi-core optical connector 30 is connected to the receptacle 20, and, in accordance with a request of the branch destination, connected to a connector on the side of the branch line optical fiber cable 12. In the where the ribbon is separated into single-core optical fibers 3, single-core optical connectors are connected and used.

Also a tape unit 4 which is not connected to the branch destination in this case may be housed in the extra-length housing portion 18 while being wound therearound, so that as required a connector is attached to the tape unit, and the tape unit is then used.

The multi-core optical connector 30 which is connected to the tip end of the tape unit 4 may have a polishless connection end face, and the internal optical fiber may be fixed by a cyano adhesive agent. In this case, the work of connecting the connector to the tape unit 4 can be performed for a short time period. A refractive index matching sheet is applied to the connection end face of the multi-core optical connector 30, to prevent the light wave from reflecting in the connecting portion. In the case where a refractive index matching agent such as grease is used, a wiping work and the like are required each time when a connecting work is performed. When a sheet is previously applied, the work can be eliminated.

FIG. 8 shows portions attached to the base member 16, in an exploded manner. The connector attaching portion 19 has a shape where a space into which the receptacle 20 is attached is cut away in two places of a semicircular plate member, and is fitted and attached into a groove portion 32 which is circumferentially formed in the outer periphery of the base member 16. One connector attaching portion 19 is attached to each of the base members 16, and plural connector attaching portions are placed isotropically in the circumferential direction of the base members 16, so that the receptacles 20 can be evenly arranged and placed in four circumferential places. Even after the optical fiber branch cable 1 is wired, therefore, a work in the connector attaching portions 19, or i.e., the connector connections in the receptacles 20 can be performed in any circumferential position, and it is possible to flexibly cope with a change of the branch destination. Therefore, the workability is excellent. Moreover, the receptacles 20 can be freely attached to and detached from the connector attaching portions 19, and hence also the circumferential positions of the receptacles 20 can be changed. In the case where the connector attaching portion 19 is attachable or slidable to plural longitudinal positions of the base member 16, the connection to the receptacle 20 can be performed in a position which is suitable to the extra length of the tape unit 4 or the branch line optical fiber cable 12.

The cable gripping portion 22 is a hard plastic member in which gripping grooves 22a having plural claws are formed, and attached to the base member 16 by adhesion or the like. The cable gripping portion 22 grips and fixes the outer jacket of the branch line optical fiber cable 12 housed in the gripping groove 22a. In the fixing cover 23 which is attached to the cable gripping portion 22, as shown in FIG. 9, an arm portion 23b is integrally formed on the both sides of a main portion 23a which covers the cable gripping portion 22. When the fixing cover 23 is to be attached to the cable gripping portion 22, the arm portions 23a are elastically deformed toward the main portion 23a, and fitted into plural recesses 33 formed in the base member 16, respectively. In the fixing cover 23, the main portion 23a is fixed to the cable gripping portion 22, and the fixing cover is fixed to the base member 16 by also a force which is exerted by outward elastic restoring of the arm portions 23a.

FIG. 10 shows the cover 15 which is an outer shell of the branch portion 11, in an exploded manner. The cover 15 is configured by the main cover 13 and the opening and closing cover 14. The opening and closing cover 14 is formed by a material which is susceptible to be elastically deformed, such as rubber, and the main cover 13 is formed by a plastic which is harder and more elastic than the opening and closing cover 14. Furthermore, the main cover 13 and the opening and closing cover 14 are made of a material which has been undergone an antistatic treatment such as addition of an antistatic agent, so that static electricity is prevented from being generated, thereby enhancing the dust-proofness of the branch portion 11. When the longitudinal end portions of the main cover 13 are made of a flexible material such as rubber, for example, the multi-core optical fiber cable 2 is prevented from being bent at a steep angle in an end portion of the branch portion 11, thereby allowing the optical fiber branch cable 1 to be easily wound around a drum. Therefore, the handleability is improved.

In a similar manner as the base members 16, the cover 15 has symmetric half-split shapes, and is fixed by attaching a binding band 37 (see FIG. 1) into groove portions 36 which are circumferentially formed by butting the shapes against each other. The opening and closing cover 14 is attached to the main cover 13, and can be opened or closed by elastic deformation. When the opening and closing cover 14 is opened, the receptacles 20 and the cable gripping portions 22 can be accessed through openings 34, 35 formed in the main cover 13. In the case where the branch line optical fiber cable 12 connected to the receptacle 20 is to be changed, for example, it is not required to remove away the whole of the cover 15, and the work can be performed while only the opening and closing cover 14 is opened.

In the optical fiber branch cable 1 of the above-described embodiment, the base members 16 are attached to the multi-core optical fiber cable 2 of a trunk line so as to cover the tensile-strength wires 9 in the portion where the cable jacket 10 is removed away, and therefore the branch portion 11 can be firmly fixed to the multi-core optical fiber cable 2 without cutting the tensile-strength wires 9. Moreover, the tensile strength of the multi-core optical fiber cable 2 is not lowered, and the handleability as a cable is excellent. Since the base members 16 have a shape covering the tensile-strength wires 9, moreover, they can be placed in the vicinity of the center of the cable, and hence the structure of the branch portion 11 can be miniaturized by placing the extra-length housing portions 18 and the connector attaching portions 19 in the vicinity thereof. In the case where the diameter of the multi-core optical fiber cable 2 is 16 mm, for example, that of the cover 15 can be set to about 40 mm. Therefore, also a portion where the branch portion 11 is disposed can be handled as a part of the cable in the same manner as a portion where only the multi-core optical fiber cable 2 exists, and the wiring workability is excellent.

As a method of wiring an optical fiber in a building or an apartment building with using the above-described optical fiber branch cable 1, there are the following exemplified methods.

In a first method, after the optical fiber branch cable 1 in the state where the multi-core optical connector 30 is connected to the receptacle 20 is vertically wired and the branch line optical fiber cables 12 to be branched to households are horizontally wired, optical connectors attached to the end portions of the branch line optical fiber cables 12 are connected to the multi-core optical connector 30 in the receptacle 20, and extra lengths of the branch line optical fiber cables 12 are gripped by the cable gripping portions 22 and housed in the branch portion 11.

In a second method, the optical fiber branch cable 1 in the state where the multi-core optical connector 30 is connected to the receptacle 20 is vertically wired, optical connectors attached to the end portions of the branch line optical fiber cables 12 to be branched to households are connected to the multi-core optical connector 30 in the receptacle 20, and thereafter the branch line optical fiber cables 12 are horizontally wired to households.

In a third method, before the optical fiber branch cable 1 is vertically wired, optical connectors attached to the end portions of the branch line optical fiber cables 12 to be branched to households are connected to the multi-core optical connector 30 in the receptacle 20, and the branch line optical fiber cables 12 are horizontally wired to households at a predetermined place from the branch portion 11 while the optical fiber branch cable 1 is vertically wired.

In these wiring methods using the optical fiber branch cable 1, the wiring work can be performed very easily and efficiently as compared with the conventional art. The methods are effective in the case where an optical fiber cable of a trunk line is vertically wired in a building or an apartment building and a branch line optical fiber cable is horizontally wired.

In the case where the optical fiber branch cable 1 is to be transported from the factory to a wiring site in a building, an apartment building, or the like, the optical fiber branch cable 1 in the state where the multi-core optical connector 30 is connected to the receptacle 20 may be wound around a drum in the same manner as a usual multi-core optical fiber cable of a trunk line, and, in this state, provided to the wiring place.

Alternatively, optical connectors attached to the end portions of the branch line optical fiber cables 12 are previously connected to the multi-core optical connector 30 of the optical fiber branch cable 1 in the state where the multi-core optical connector 30 is connected to the receptacle 20, and the branch line optical fiber cables 12 which are exposed to the outside of the branch portion 11 may be wound around a drum together with the optical fiber branch cable 1, and, in this state, provided to a wiring place.

As described above, according to these providing methods using the optical fiber branch cable 1, in the case where the optical fiber cable 2 of a trunk line is to be carried in a wiring site, the cable can be carried in the site while the cable is transported from the factory in the state of an optical fiber branch cable that already has a structure in which a branching wiring process can be easily performed, or a structure in which a branching wiring process has been already performed. Therefore, the branching work in the site can be simplified.

Although the invention has been described in detail and with reference to the specific embodiment, it is obvious to those skilled in the art that various modifications and variations are possible without departing the spirit and scope of the invention. The present application is based on Japanese Patent Application (No. 2006-039769) filed Feb. 16, 2006, and its disclosure is incorporated herein by reference.

The invention claimed is:

1. An optical fiber branch cable in which, in a middle of a multi-core optical fiber cable of a trunk line having plural optical fibers, a tensile-strength wire, and a cable jacket, one or more branch portions for said optical fibers are disposed, wherein said branch portion comprises:
a base member which is attached so as to cover said tensile-strength wire in a portion where said cable jacket of said multi-core optical fiber cable is removed away;
an optical connector which is connected to a tip end of said optical fiber drawn out from said multi-core optical fiber cable;
an extra-length housing portion which houses an extra length of said optical fiber to which said optical connector is connected;
a connector attaching portion to which said optical connector is attachable in a plural number, and the connector attaching portion is located in a vicinity of the extra-length housing portion; and
a circular outer shell cover comprising a plurality of sectional portions, obtained by assembling the plurality of sectional portions, and
wherein:
the multi-core optical fiber cable is a cable having a slotless structure in which the plural optical fibers are housed in a middle portion of the multi-core optical fiber cable, and the tensile-strength wire is placed in the cable jacket formed in a periphery thereof, and
the extra-length housing portion comprising at least one barrel portion around which the optical fiber drawn out from the multi-core optical fiber is wound.

2. An optical fiber branch cable according to claim 1 wherein said optical fibers drawn out from said multi-core optical fiber cable are in a form of an optical fiber ribbon, and said optical connector is a multi-core optical connector.

3. An optical fiber branch cable according to claim 2, wherein
a notch which enables separation into said respective plural optical fibers is formed in a covering layer of said optical fiber ribbon.

4. An optical fiber branch cable according to claim 1, wherein
said connector attaching portion is placed in a plural number in a circumferential direction of said base member.

5. An optical fiber branch cable according to claim 1, wherein
said connector attaching portion is attachable to and detachable from said base member.

6. An optical fiber branch cable according to claim 1, wherein
said connector attaching portion is movable with respect to said base member in a longitudinal direction of said multi-core optical fiber cable.

7. An optical fiber branch cable according to claim 1, wherein
said outer shell cover is made of an elastic and antistatic material.

8. An optical fiber branch cable according to claim 1, wherein
said branch portion comprises a branch line optical fiber cable fixing portion which fixes a branch line optical fiber cable that is to be connected to said optical connector.

9. A method of wiring an optical fiber branch cable wherein, after an optical fiber branch cable according to claim 1 and a branch line optical fiber cable which is to be connected to said optical connector are wired, said branch line optical fiber cable is connected to said optical connector, and an extra length of said branch line optical fiber cable is housed in said branch portion.

10. A method of wiring an optical fiber branch cable wherein, after an optical fiber branch cable according to claim 1 is wired and a branch line optical fiber cable is connected to said optical connector, said branch line optical fiber cable is wired.

11. A method of wiring an optical fiber branch cable wherein, before an optical fiber branch cable according to claim 1 is wired, a branch line optical fiber cable is connected to said optical connector, and, while said optical fiber branch cable is wired, said branch line optical fiber cable is wired in a predetermined place.

12. A method of providing an optical fiber branch cable wherein an optical fiber branch cable according to claim 1 is provided to a wiring place in a state where said optical fiber branch cable is wound around a drum.

13. A method of providing an optical fiber branch cable wherein an optical fiber branch cable according to claim 1 and a branch line optical fiber cable are provided to a wiring place in a state where said branch line optical fiber cable is connected to said optical connector of said optical fiber branch cable, and said optical fiber branch cable and said branch line optical fiber cable are wound around a drum.

* * * * *